US005979774A

United States Patent [19]

Urushibata

[11] Patent Number: 5,979,774

[45] Date of Patent: Nov. 9, 1999

[54] MAGNETIC DISPLAY ERASING APPARATUS INCLUDING A PLURALITY OF MAGNETS

[75] Inventor: Kiyoshi Urushibata, Shizuoka, Japan

[73] Assignee: Star Micronics Co., Ltd., Shizuoka, Japan

[21] Appl. No.: 08/756,808

[22] Filed: Nov. 26, 1996

[30] Foreign Application Priority Data

Nov. 28, 1995 [JP] Japan .................................... 7-309480

[51] Int. Cl.[6] ...................................................... G06F 19/06

[52] U.S. Cl. ........................... 235/493; 235/449; 360/118

[58] Field of Search ..................................... 235/493, 439, 235/444, 449, 450; 360/118

[56] References Cited

U.S. PATENT DOCUMENTS

| | | | |
|---|---|---|---|
| 3,660,727 | 5/1972 | Ohira et al. | 317/157.5 |
| 4,157,581 | 6/1979 | Keiichi et al. | 361/267 |
| 4,543,586 | 9/1985 | Parker | 346/74.4 |
| 4,613,919 | 9/1986 | Miyatake et al. | 360/118 |
| 4,675,476 | 6/1987 | Kobayashi | 345/173 |
| 5,132,860 | 7/1992 | Von Stein | 360/118 |
| 5,186,631 | 2/1993 | Okutsu | 434/409 |
| 5,359,183 | 10/1994 | Skodlar | 235/493 |
| 5,643,686 | 7/1997 | Isshiki et al. | 428/694 |
| 5,787,619 | 8/1998 | Urushibata | 235/493 X |
| 5,790,006 | 8/1998 | Abele et al. | 335/306 |

FOREIGN PATENT DOCUMENTS

| | | |
|---|---|---|
| 54-29895 | 9/1979 | Japan . |
| 6-168369 | 6/1994 | Japan . |
| 7-6901 | 1/1995 | Japan . |
| 8-185132A | 7/1996 | Japan . |
| 9-114941A | 5/1997 | Japan . |

*Primary Examiner*—Donald Hajec
*Assistant Examiner*—Jared J. Fureman
*Attorney, Agent, or Firm*—Wenderoth, Lind & Ponack, L.L.P.

[57] ABSTRACT

A magnetic display erasing apparatus is provided in which an ideal erasing magnetic field can be realized by using a small-sized magnet. A magnet is formed by bending a rectangular plate-like magnet, having the N-pole on the surface and the S-pole on the back face, into a U-shape so that the N-pole of one end of the magnet confronts the N-pole of the other end thereof symmetrically with respect to a magnetic display sheet. The magnetic display sheet is conveyed by a conveying apparatus, which is not shown, in the U-shaped gap space which is formed by the magnet. Because the magnetic field is symmetrical with respect to the plane of the magnetic display sheet, an ideal planar magnetic field is attained on the disposition plane of the magnetic display sheet. There is no point where the strength of the magnetic field is zero. Therefore, the whole region of the empty space can be used for erasure and the space utilization efficiency of the magnet is enhanced.

6 Claims, 10 Drawing Sheets

MAGNETIC DISPLAY ERASING APPARATUS INCLUDING A PLURALITY OF MAGNETS

BACKGROUND OF THE INVENTION

1. Field of the Invention

The present invention relates to a magnetic display erasing apparatus for a magnetic display sheet which is sensitive to a magnetic field and displays visible information.

2. Description of the Related Art

Conventionally, magnetic cards in which a magnetic stripe is formed along the longitudinal direction thereof are widely used in various fields such as bank cards, credit cards, and ID cards. In such cards a magnetic stripe is recorded, for example, to store an identification code of a user of the card, as patterns of orientations or strengths of magnetization.

However, since data recorded in such a magnetic stripe are invisible information, a special apparatus such as a card reader is necessary when the recorded data are to be directly checked.

A magnetic card of another type is known in which a magnetic display sheet, which contains a micro capsule sensitive to a magnetic field, is formed at a position other than the position of a magnetic stripe (for example, Japanese Unexamined Patent Publication JP-A 6-168369 (1994)).

FIG. 12 is a sectional view showing an example of a magnetic display sheet 1. In a capsule 3, flat magnetic flakes 5 are encapsulated together with an oil 4, and a number of capsules 3 are sealed between a substrate member 2 and a protective layer 6. When a magnetic field perpendicular to the magnetic display sheet 1 is applied to the magnetic flakes 5, the magnetic flakes 5 are perpendicularly oriented, so that the optical reflectivity is reduced with the result that the magnetic display sheet 1 becomes dark. On the other hand, when a magnetic field parallel to the card substrate is applied to the magnetic flakes 5, the magnetic flakes 5 are oriented in parallel to each other, so that the optical reflectivity is increased with the result that the magnetic display sheet becomes bright. On this principle, the magnetic display sheet 1 can display visible information such as characters and symbols in accordance with the direction of the applied magnetic field. Consequently, the magnetic card is remarkably improved in ease of use.

FIGS. 13A and 13B are a plan view and a side view, respectively, showing an example of a prior art magnetic display erasing apparatus. Such a configuration is disclosed in Japanese Unexamined Utility Model Publication JP-U 7-6901 (1995), and Japanese Examined Patent Publication JP-B2 54-29895 (1979). A pair of permanent magnets 7 are disposed at a predetermined interval so that the magnetic poles thereof, which confront each other via the magnetic display sheet 1 provided on a surface of the card, have the same polarity, and an erasing operation is realized by moving the magnetic display sheet 1 between the pair of permanent magnets.

In this configuration, a substantially planar magnetic field can be applied to the magnetic display sheet 1, and hence it is expected that the erasing quality is improved.

As shown in FIGS. 13A–13B, however, since the magnets 7, which have an identical plate-like shape (herein round shape) and the same coercive force, are disposed in parallel to each other, at the center of gravity A of a pattern (the center of a circle), which is obtained by projection of the magnets 7 on the plane of the magnetic display sheet 1 (in the example, the pattern is identical with that obtained by orthogonal projection of the magnets 7), the magnetic fields produced by the magnets 7 perpendicularly act on the magnetic display sheet, and cancel each other because the magnetic fields on the center A are equal to each other, with the result that the magnetic field strength on the center A becomes zero.

Consequently, the region of the magnetic display sheet 1 which passes the center of gravity A is not subjected to the erasing operation, so that the magnetic display in this region is not erased and remains as a black line. This is applicable also to the case where the magnets are of a triangular, square, or semicircular shape. When there are plural pairs of poles confronting each other, a black line remains at the center of gravity of each of plural pole region patterns which are obtained by projecting (orthogonally projecting) the regions of the confronting poles on the plane of the magnetic display sheet 1. An ideal planar magnetic field acts on the region other than the vicinity of the center of gravity A, and hence a perfect erasing operation is executed in such a region.

In order to avoid such a region which is beyond the effect of the erasing operation, the magnets 7 must be disposed so that the magnetic display sheet 1 does not pass the vicinity of the center of gravity A. When circular magnets are used as shown in FIGS. 13A–13B, therefore, only a half or less portion of the magnetic fields produced by the magnets 7 is used in the erasing operation, thereby lowering the space utilization efficiency of the magnets 7. As a result, this makes the miniaturization of the whole apparatus difficult and causes further restrictions on the design.

SUMMARY OF THE INVENTION

It is an object of the invention to provide a magnetic display erasing apparatus in which an ideal erasing magnetic field can be realized by using a small-sized magnet.

The invention provides a magnetic display erasing apparatus comprising magnetic field producing means having a pair of magnets in which poles of the same polarity confront each other via a disposition plane where a magnetic display sheet is to be disposed, wherein the magnetic field producing means generates a planar magnetic field on the disposition plane, thereby erasing a visible display which is magnetically written into the magnetic display sheet. The pair of magnets are magnetized or disposed so that a point (a magnetic field dead point), where magnetic fields produced by the same polarity of the pair of magnets cancel each other and a strength of a resulting magnetic field is zero, is deviated from a center of gravity of a projection pattern formed on the disposition plane by connecting the pair of magnets to each other.

According to the invention, it is possible to enlarge an area which can be used for erasure in the planar magnetic field produced by the magnets. Since the gap space formed by the magnets can be efficiently used, the magnets and the apparatus can be reduced in size and weight.

The invention provides a magnetic display erasing apparatus comprising magnetic field producing means having a pair of first and second magnets in which poles of the same polarity confront each other via a disposition plane where a magnetic display sheet is to be disposed, wherein the magnetic field producing means generates a planar magnetic field on the disposition plane, thereby erasing a visible display which is magnetically written into the magnetic display sheet, and wherein a third magnet is disposed so as to have a pole which is directed from a side of the disposition plane to a space formed between the pair of magnets, and thereby a whole region on the disposition plane in a space surrounded by the first, second, and third magnets is covered with the planar magnetic field.

According to the invention, since there is no point where the strength of the magnetic field is zero on the disposition plane in the gap space surrounded by the magnets, the whole region of the gap space can be used for erasure. Additionally, since the gap space formed by the magnets can be efficiently used, the magnets and the apparatus can be reduced in size and weight.

The invention provides a magnetic display erasing apparatus comprising magnetic field producing means having a pole face in which poles of the same polarity confront each other via a disposition plane where a magnetic display sheet is to be disposed, wherein the magnetic field producing means generates a planar magnetic field on the disposition plane, thereby erasing a visible display which is magnetically written into the magnetic display sheet, and wherein the pole face of the magnetic field producing means is a part of a magnet body which is continuous, or which is composed of magnet members connected to each other on a side of the disposition plane, and faces of the magnet body, which confront the magnetic display sheet, are substantially continuous and magnetized to the same polarity.

According to the invention, since there is no point where the strength of the magnetic field is zero on the disposition plane in the substantially U-shaped gap space formed by the magnet, the whole region of the gap space can be used for erasure. Additionally, since the gap space formed by the magnet can be efficiently used, the magnet and the apparatus can be reduced in size and weight. Moreover, since the magnet integrated into one body is used, the magnet is easy to handle and manufacture, and thus the magnet can be economically produced. For example, such a magnet may be produced by simply setting a flexible rubber magnet into a jig and then bending it.

As described above in detail, according to the invention, it is possible to enlarge an area which can be used for erasure in the planar magnetic field produced by the magnet, and the space utilization efficiency of the magnet is increased. Since the magnetic field produced by the magnet can be efficiently used, the magnet and the apparatus can be reduced in size and weight. The planar magnetic field can act on the whole region of the magnetic display sheet, and a convey path can be set on the planar magnetic field, whereby there is no unerased region on the magnetic display sheet.

BRIEF DESCRIPTION OF THE DRAWINGS

Other and further objects, features, and advantages of the invention will be more explicit from the following detailed description taken with reference to the drawings wherein:

FIGS. 1A through 1C show a first embodiment of the invention, wherein FIG. 1A is a perspective view, FIG. 1B is a sectional view of magnets, etc. which is taken along a plane vertical to a conveying direction of a magnetic display sheet, and FIG. 1C is a magnetic flux line chart showing magnetic fields produced by the magnets of FIG. 1B;

FIGS. 4A through 4C show a still further embodiment of the invention, wherein FIG. 4A is a perspective view, FIG. 4B is a sectional view of magnets, etc. which is taken along a plane vertical to a conveying direction of a magnetic display sheet, and FIG. 4C is a magnetic flux line chart showing magnetic fields produced by the magnets of FIG. 4B;

FIGS. 6A through 6C show a still further embodiment of the invention, wherein FIG. 6A is a perspective view, FIG. 6B is a sectional view of magnets, etc. which is taken along a plane vertical to a conveying direction of a magnetic display sheet, and FIG. 6C is a magnetic flux line chart showing magnetic fields produced by the magnets of FIG. 6B;

FIGS. 8A through 8C show a still further embodiment of the invention, wherein FIG. 8A is a perspective view, FIG. 8B is a sectional view of a magnet, etc. which is taken along a plane vertical to a conveying direction of a magnetic display sheet, and FIG. 8C is a magnetic flux line chart showing a magnetic field produced by the magnet of FIG. 8B;

FIGS. 13A and 13B are views of an example of a prior art magnetic display erasing apparatus, wherein FIG. 13A is a plan view, and FIG. 13B is a side view.

DESCRIPTION OF THE PREFERRED EMBODIMENTS

Figure 1A:
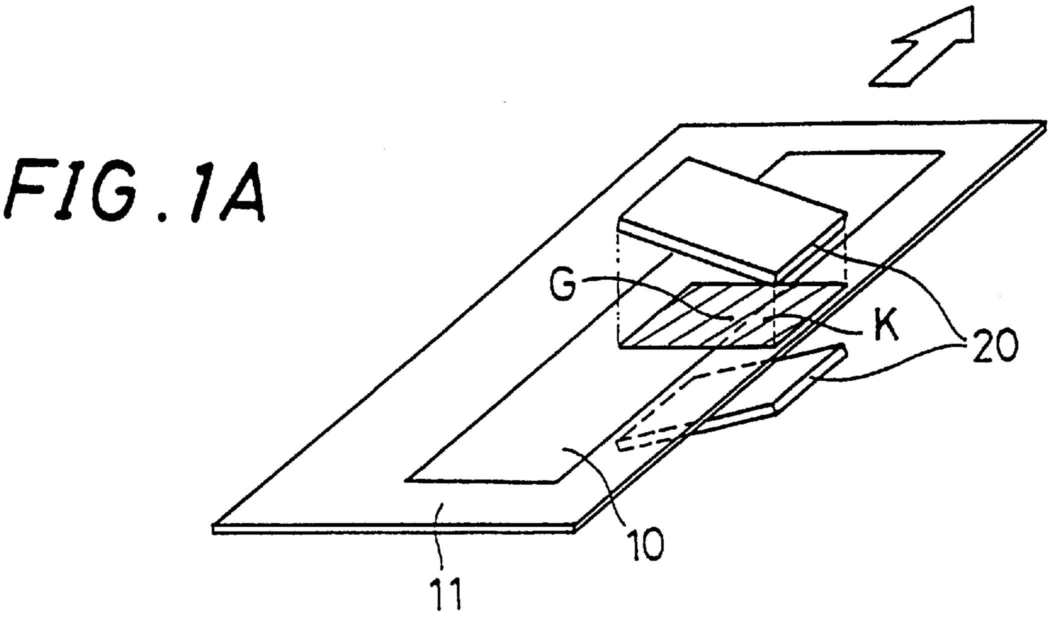

Now referring to the drawings, preferred embodiments of the invention are described below.

Figure 1B:
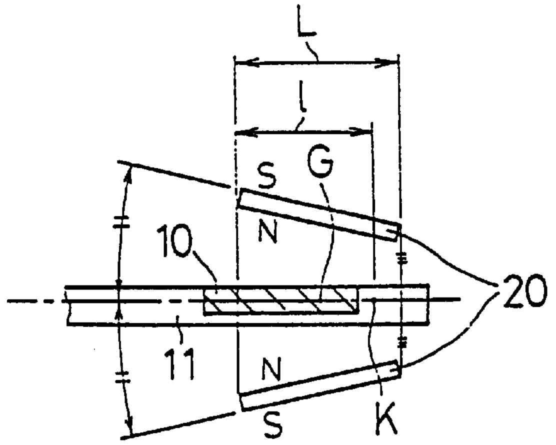
Figure 1C:
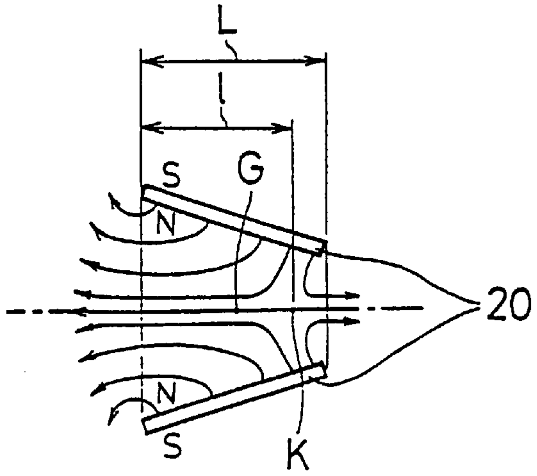
Figure 2:
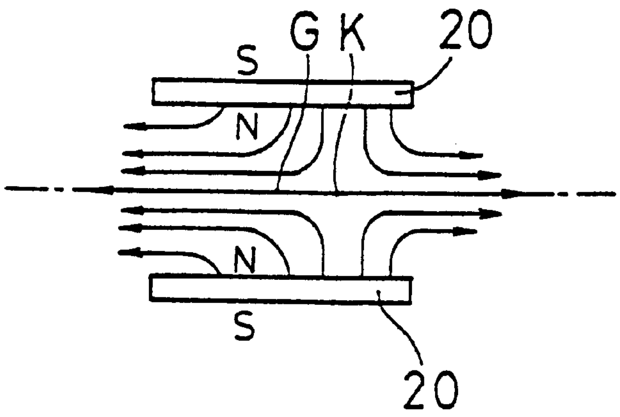
FIG. 2 is a sectional view showing another similar embodiment of the invention.
Figure 3:
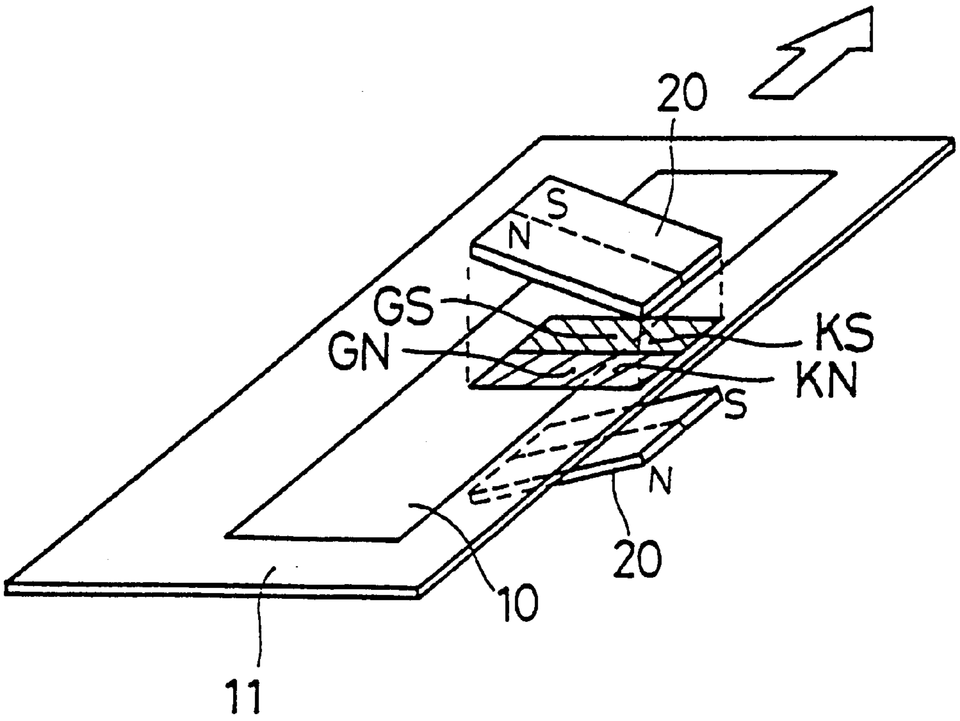
FIG. 3 is a perspective view showing still another embodiment of the invention.

FIGS. 1A through 1C show a first embodiment of the invention, wherein FIG. 1A is a perspective view, FIG. 1B is a sectional view of magnets, etc. which is taken along a plane vertical to a conveying direction of a magnetic display sheet, and FIG. 1C is a magnetic flux line chart showing a magnetic field produced by the magnets of FIG. 1B. FIG. 2 is a sectional view showing another similar embodiment, and FIG. 3 is a perspective view showing a further embodiment. In FIGS. 1A and 3, the hatched regions show a projection pattern of magnets 20 which is obtained by orthogonally projecting the magnets onto the plane between and equidistant from the magnets 20. The plane is called a disposition plane where the magnetic display sheet 10 is to be disposed.

The magnetic display sheet 10 is formed in a rectangular substrate 11 made of a plastic or the like and conveyed by a conveying apparatus, which is not shown (e.g., a belt conveyor), in the longitudinal direction.

The plate-like magnets 20 having an identical quadrangular shape and the same coercive force are arranged parallel with the conveying direction of the magnetic display sheet 10, and are inclined by the same angle so that their N-poles confront each other via the disposition plane of the magnetic display sheet 10 and so that the magnets are separated at a predetermined interval to form the two oblique sides of a trapezoid. The magnets 20 are disposed so as to be symmetrical with respect to the disposition plane of the magnetic display sheet 10. The magnetic display sheet 10 is conveyed by conveying means, which is not shown, in the gap space which is defined by the magnets 20.

When a static magnetic field is to be considered, it is usual that a magnetic field due to a current is usually obtained from the Biot-Savart's law, a magnetic field due to a ferromagnetic substance or a permanent magnet is obtained from the Coulomb's law using a magnetic moment, and the total magnetic field is obtained by adding the magnetic fields together. A magnetic flux line chart of the magnetic fields which are produced by the magnets 20 and obtained in this way is as shown in FIG. 1C.

As described above, since the magnets 20 are disposed so as to be symmetrical with respect to the disposition plane of the magnetic display sheet 10, the magnetic fields of the magnets 20 are also symmetrical with respect to the disposition plane of the magnetic display sheet 10, with the result that a planar magnetic field is formed on the disposition plane of the magnetic display sheet 10. In the present embodiment of the invention, the ideal planar magnetic field produced by the magnets coincides with the disposition plane of the magnetic display sheet.

As shown in FIG. 1A, a projection pattern of the magnets 20 which is formed by connecting the corresponding corners of the rectangular magnets 20 confronting each other by straight lines and then connecting intersection points where the lines intersect the disposition plane of the magnetic display sheet 10 is quadrangular (the hatched region). In the embodiment of the invention, since the magnets 20 are disposed so as to be symmetrical with respect to the disposition plane of the magnetic display sheet 10, the projection pattern of the magnets 20 coincides with that which is obtained by orthogonally projecting the magnets onto the disposition plane of the magnetic display sheet 10.

The center of gravity of the quadrangular projection pattern is positioned at a position indicated by G.

Figure 13A:
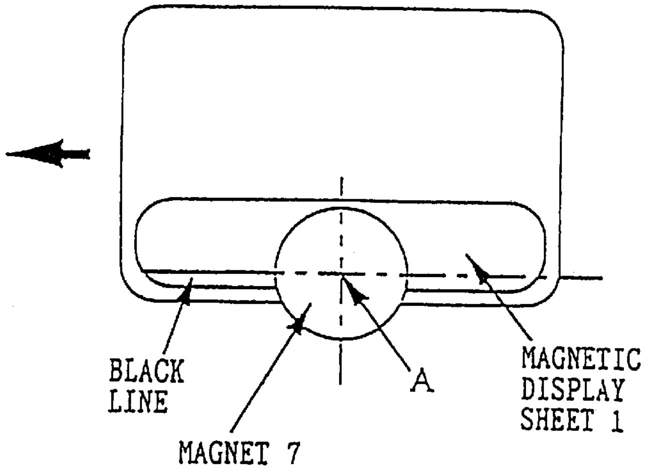
FIG. 13A (PRIOR ART)
Figure 13B:
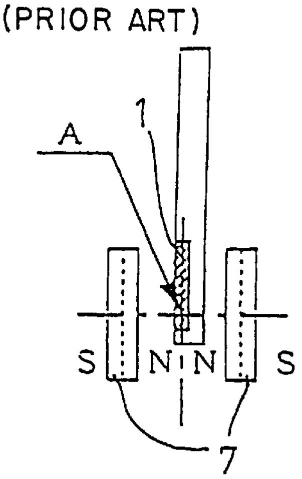
FIG. 13B (PRIOR ART)

At a point K, the magnetic fields produced by the magnets 20 cross each other and cancel each other, so that the strength of the synthesized magnetic field is zero. Consequently, the erasing operation is not performed in the vicinity of the point K. As a result, the region other than the vicinity of the point K constitutes an erasable region. Such a point where magnetic fields of the same polarity canceled each other and the strength of a resulting magnetic field is zero is called a magnetic field dead point. In the prior art as shown in FIGS. 13A–13B where the magnets are disposed in parallel, the dead point K coincides with the center of gravity G and hence only a half or less portion of the projection pattern is used in the erasing operation. By contrast, in the embodiment of the invention, the magnets are inclined and the poles of the same polarity confront each other via the magnetic display sheet 10 interposed between them, and hence the magnetic field dead point K does not coincide with the center of gravity G. The magnetic field dead point K is deviated to a rightward position from the middle of the length L of the projection pattern which is obtained by orthogonally projecting the magnets 20 onto the disposition plane of the magnetic display sheet 10, and the magnetic field at the center of gravity G is not zero. The length of the left side of the magnetic field dead point K (on the length 1 side) is longer than a half of the length L, so that the space utilization efficiency of the magnets 20 is considered to be enhanced. As described above, in the region other than the magnetic field dead point K, an ideal planar magnetic field is attained. Therefore, when the magnetic display sheet 10 is disposed and conveyed in the region corresponding to the length 1 as shown in FIG. 1B, the whole area of the magnetic display sheet 10 can be erased.

FIG. 2 is a sectional view showing another similar embodiment in which magnets 20 having identical shape and the same distribution pattern of the magnetic moment are disposed in parallel. In the magnets 20, the coercive force of the right portion in the figure is greater than that of the left portion. Also in the embodiment, the dead point K of the synthesized magnetic field produced by the magnets 20 does not coincide with the center of gravity G of the projection pattern of the magnets. The magnetic field dead point K is deviated to a rightward position from the middle of the length L of the projection pattern which is obtained by orthogonally projecting the magnets 20 onto the plane of the magnetic display sheet. Therefore, the space utilization efficiency of the magnets 20 is considered to be enhanced. As apparent also from the above-described embodiment, the shapes of the magnets 20, the distribution of the magnetic moment, and the positions of the magnets 20 can be arbitrarily determined as far as a planar magnetic field is produced by the magnets 20.

FIG. 3 shows a further embodiment. In the embodiment, magnets 20 having two poles which are juxtaposed along the conveying direction of the magnetic display sheet 10 are inclined so that poles of the same polarity confront each other. In this configuration, magnetic field dead points KN and KS of the synthesized magnetic fields produced by the confronting poles do not coincide with the center of gravities GN and GS of the patterns which are obtained by projecting the pole regions. The magnetic field dead points are deviated to rightward positions from the middle of the length L of the pattern which is obtained by projecting the magnets 20 onto the plane of the magnetic display sheet. Therefore, the space utilization efficiency of the magnets 20 is enhanced.

In the embodiments described above, the magnetic display sheet 10 is conveyed, however, alternatively, the magnets 20 may be moved, or the magnetic display sheet and the magnets may be relatively moved. Additionally it is possible that the sections of the magnets shown in FIG. 1B from a predetermined angle with respect to the conveying direction instead of being vertical to the conveying direction of the magnetic display sheet 10. In the embodiments, the magnetic display sheet 10 is disposed so as to overlap the projection pattern of the magnets 20. Alternatively, the magnetic display sheet may be disposed outside the projection pattern. Although in the magnets 20 of FIGS. 1A and 2, the N-poles of the magnets confront each other, the S-poles thereof may confront each other, and in this alternative configuration the directions of the magnetic fields are inverted, but the same effects as described above can be attained.

Figure 4A:
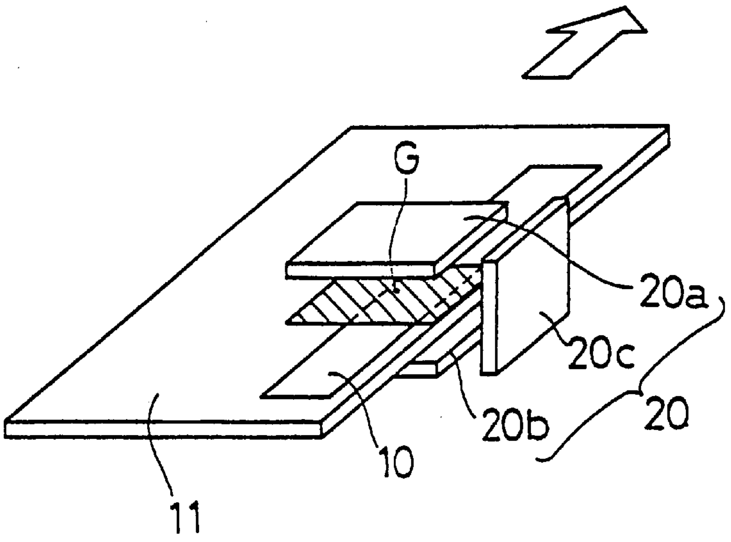
Figure 4B:
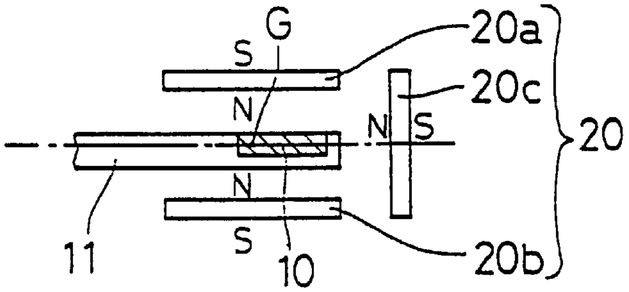
Figure 4C:
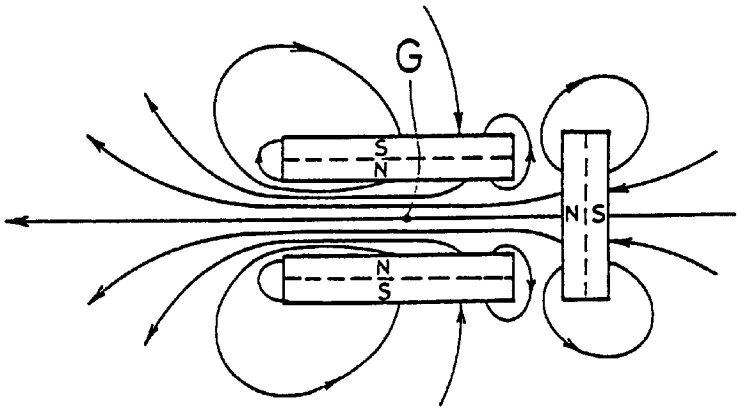
Figure 5:
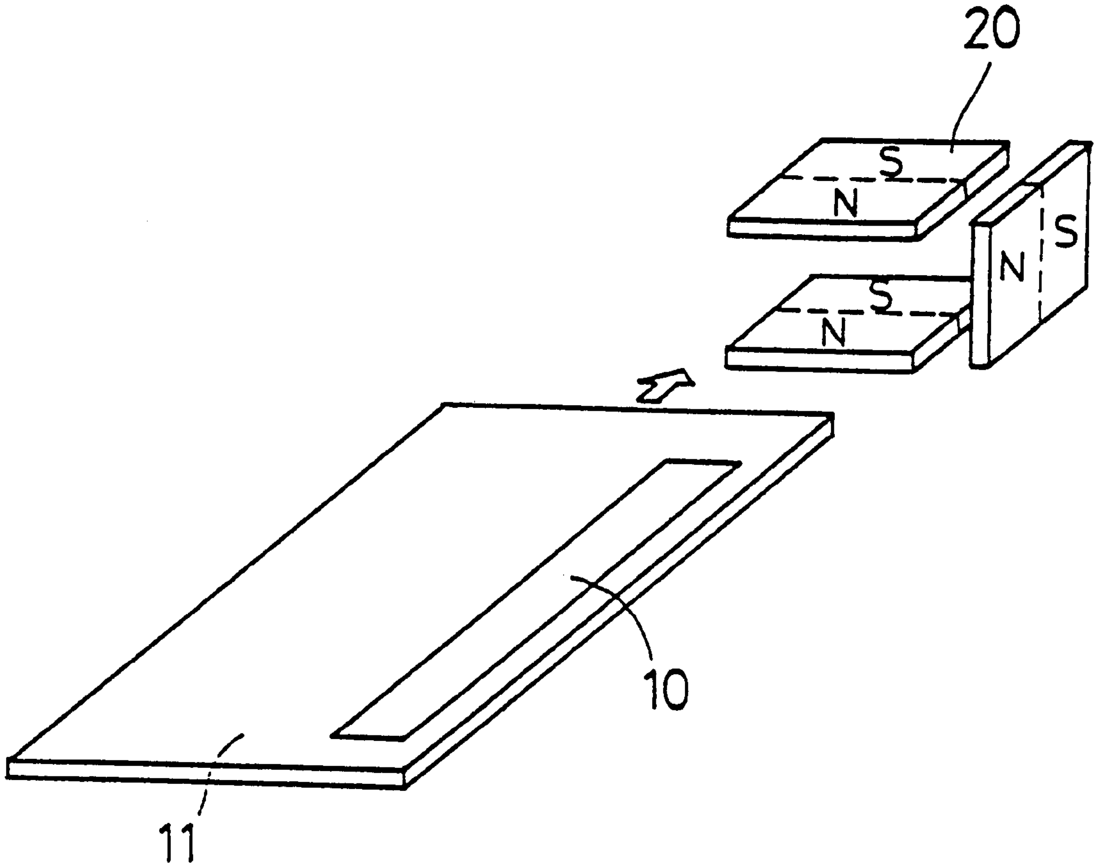
FIG. 5 is a perspective view showing another similar embodiment of the invention.

FIGS. 4A–4C show a still further embodiment of the invention, wherein FIG. 4A is a perspective view, FIG. 4B is a sectional view of magnets, etc. which is taken along a plane vertical to a conveying direction of a magnetic display sheet, and FIG. 4C is a magnetic flux line chart showing magnetic fields produced by the magnets of FIG. 4B. FIG. 5 is a perspective view showing another similar embodiment.

The magnetic display sheet 10 is formed in a rectangular substrate 11 made of a plastic or the like and conveyed by a conveying apparatus which is not shown (e.g., a belt conveyor) in the longitudinal direction.

As shown in FIG. 4A, the magnet 20 is composed of three platelike magnets 20*a*, 20*b* and 20*c*, and the magnets 20*a* and 20*b*, which have identical quadrangular shape and the same coercive force, are arranged in parallel along the conveying direction of the magnetic display sheet 10, so that their N-poles confront each other at a predetermined interval in parallel to the disposition plane of the magnetic display sheet 10, and the plate-like magnet 20*c* is arranged on the side of the magnets 20*a* and 20*b* so as to be perpendicular to the magnets 20*a* and 20*b* apart from the magnets 20*a* and 20*b*, to cross the disposition plane of the magnetic display sheet 10 in symmetry with respect to the disposition plane and to have the N-pole thereof directed to the magnets 20*a* and 20*b*. The projection pattern which is obtained by performing a projection (orthogonal projection) of the magnets 20*a* and 20*b* onto the disposition plane of the magnetic display sheet 10 is quadrangular (the hatched region). The center of gravity of the projection pattern is indicated by G. The magnetic display sheet 10 is conveyed by conveying means, which is not shown, in the gap space which is defined by the magnets 20.

In the gap space through which the magnetic display sheet 10 is conveyed, as shown in FIG. 4B, the magnetic display sheet 10 is surrounded in three directions or in the vertical directions and the rightward direction by the N-poles. As seen from FIG. 4C, showing magnetic flux lines of the magnetic fields produced by the magnets 20*a* to 20*c*, magnetic fluxes emitted from the N-poles mainly diverge from the gap space to the external space of the left side. Because the magnetic fields produced by the magnets are symmetrical with respect to plane, an ideal planar magnetic field is attained on the disposition plane of the magnetic display sheet 10. When only the synthesized magnetic field of the magnets 20*a* and 20*b* is to be considered, the magnetic field dead point K is formed at the center of gravity G in the same manner as the prior art example of FIG. 13. Since the magnet 20*c* is added, no magnetic field dead point in the synthesized magnetic field of the magnets 20*a* to 20*c* is formed on the disposition plane of the magnetic display sheet 10. Since the magnets 20*a* and 20*b* are arranged at an interval from the magnet 20*c* and there is space between the magnets 20*a* and 20*b* and the magnet 20*c*, the magnetic fields from the N-poles of the magnets 20*a* and 20*b* may leak through the space. However, the amount of the leakage can be reduced by reducing the space and enhancing the coercive force of the magnet 20*c*, thereby enabling the erasing operation to be performed in the whole of the gap space. As far as the erasing operation is performed in a planar magnetic field, therefore, the erasure is enabled in both the gap space defined by the magnets 20 and the external space, thereby increasing the space utilization efficiency of the magnets 20. When the magnetic display sheet 10 is conveyed, the whole of the magnetic display sheet can be erased.

In the embodiment of the invention, the magnetic display sheet 10 is conveyed. Alternatively, the magnets 20 may be moved, or the magnetic display sheet and the magnets may be relatively moved. The magnets 20 may be disposed so as to be angled with respect to the conveying direction of the magnetic display sheet 10 instead of being parallel thereto. The magnetic display sheet 10 is disposed so as to overlap with the projection pattern of the magnets 20*a* and 20*b*. Alternatively, the magnetic display sheet may be disposed outside the projection pattern. The magnets 20*a* and 20*b* are arranged in parallel to each other.

Alternatively, the magnets 20*a* and 20*b* may be inclined as those of the first embodiment of FIG. 1. As far as a planar magnetic field is produced by the magnets 20, the shapes of the magnets 20, the distribution of the magnetic moment, and the positions of the magnets can be arbitrarily determined. As shown in FIG. 5, each magnet 20 may be a magnet in which two or more poles are juxtaposed along the conveying direction of the magnetic display sheet 10 and poles of the same polarity confront each other. In FIG. 4A, the magnetic display sheet 10 is surrounded by the N-poles of the magnets 20. Alternatively, the magnetic display sheet 10 may be surrounded by the S-poles. In the alternative, the directions of the magnetic fields are inverted, but the same effects as described above can be attained.

Figure 6A:
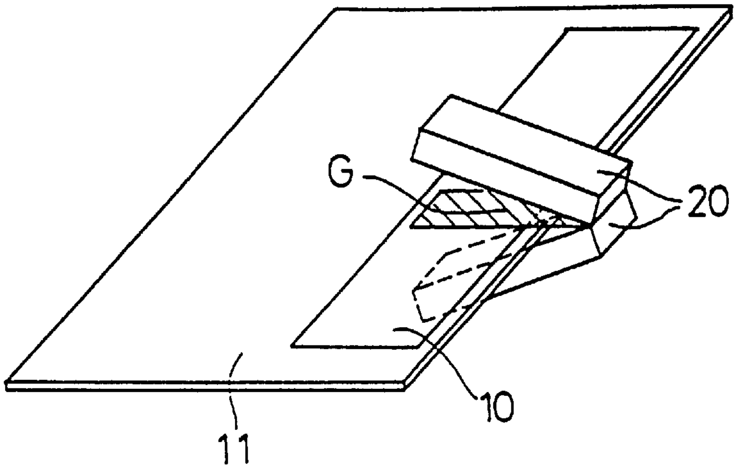
Figure 6B:
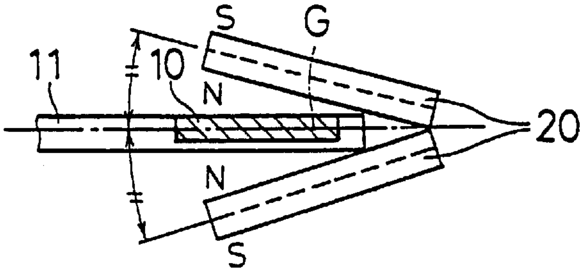
Figure 6C:
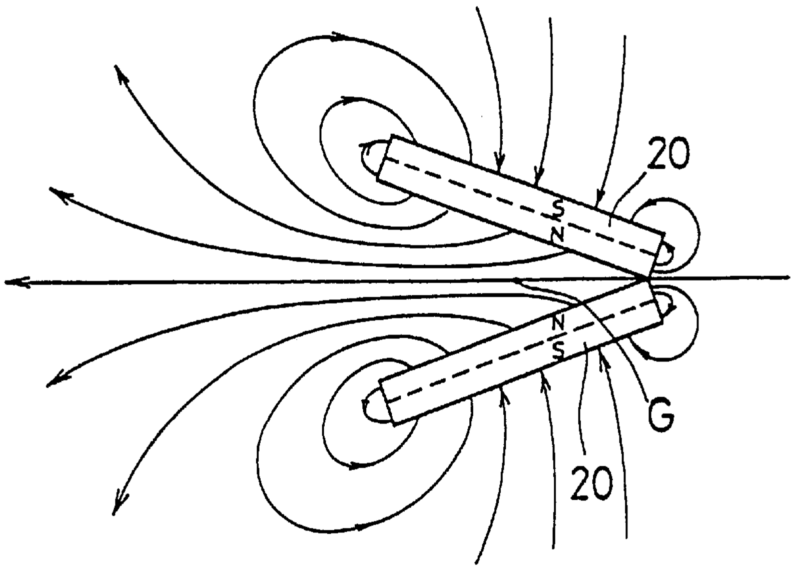
Figure 7:
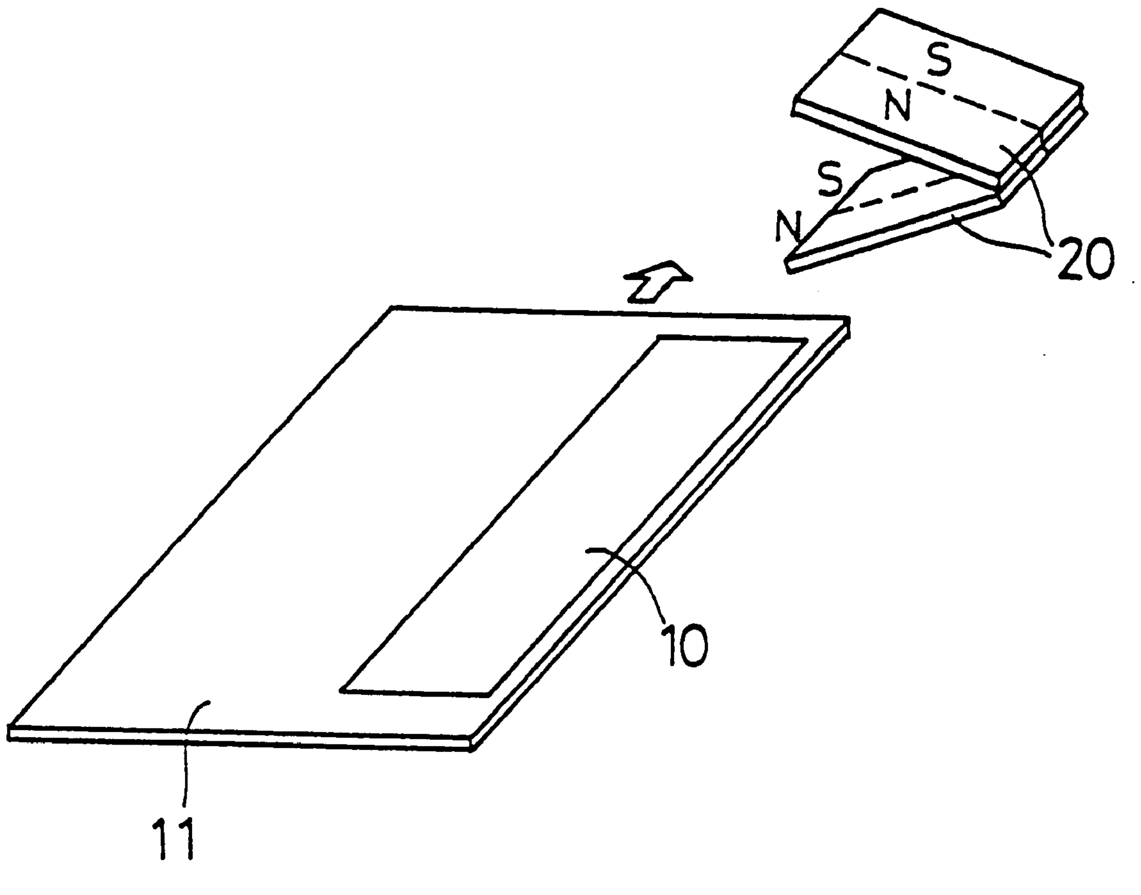
FIG. 7 is a perspective view showing another similar embodiment.

FIGS. 6A through 6C show a still further embodiment of the invention, wherein FIG. 6A is a perspective view, FIG. 6B is a sectional view of magnets, etc. which is taken along a plane vertical to a conveying direction of a magnetic display sheet, and FIG. 6C is a magnetic flux line chart showing magnetic fields produced by the magnets of FIG. 6B. FIG. 7 is a perspective view showing another similar embodiment.

The magnetic display sheet 10 is formed in a rectangular substrate 11 made of a plastic or the like and conveyed by a conveying apparatus, which is not shown (e.g., a belt conveyor), in the longitudinal direction.

As shown in FIG. 6A, plate-like magnets 20 having an identical quadrangular shape and the same coercive force are arranged parallel with the conveying direction of the magnetic display sheet 10 to have their N-poles, which confronting each other via the disposition plane of the magnetic display sheet 10 by inclining the magnets by the same angle, so as to be made in contact with each other at one end to form a V-like shape. In other words, the magnets 20 is constituted by a couple of magnets. The projection pattern which is obtained by performing a projection (orthogonal projection) of the magnets 20 onto the disposition plane of the magnetic display sheet 10 is quadrangular (the hatched region). The center of gravity of the projection pattern is indicated by G. The magnetic display sheet 10 is conveyed by conveying means, which is not shown, in the V-shaped gap space which is defined by the magnets 20.

In the gap space where the magnetic display sheet 10 is conveyed, the magnetic display sheet 10 is surrounded by the N-poles forming a V-like shape in a sectional view of the magnets 20 which is vertical to the conveying direction of the magnetic display sheet 10. As seen from FIG. 6C showing magnetic flux lines of the magnetic fields produced by the magnets 20, magnetic fluxes emitted from the N-poles diverge from the gap space to the external space. Because the magnetic fields of the magnets are symmetrical with respect to a plane, an ideal planar magnetic field is attained on the disposition plane of the magnetic display sheet 10. In the case such as shown in FIG. 1 where the one ends of the magnets 20 are arranged at a predetermined interval, the synthesized magnetic field of the magnets 20 forms a magnetic field dead point on the disposition plane of the magnetic display sheet 10. By contrast, in the embodiment of the present invention, rightward magnetic fluxes emitted from the N-poles of the magnets 20 are blocked by the ends of the magnets 20 which are disposed so as to be in contact with each other. Consequently, all the magnetic fluxes emitted from the N-poles of the magnets 20 are directed leftward, with the result that no magnetic field dead point is formed on the disposition plane of the magnetic display sheet 10. Therefore, the erasure is enabled in both the gap space defined by the magnets 20 and the external space, thereby increasing the space utilization efficiency of the magnets 20. When the magnetic display sheet 10 is conveyed, the whole of the magnetic display sheet can be erased.

In the embodiment of the invention, the magnetic display sheet 10 is conveyed. Alternatively, the magnets 20 may be moved, or the magnetic display sheet and the magnets may be relatively moved. The magnetic display sheet 10 is disposed so as to overlap with the projection pattern of the magnets 20. Alternatively, the magnetic display sheet may be disposed at a position where the sheet does not overlap with the projection pattern. As far as a planar magnetic field is produced by the magnets 20, the shapes of the magnets 20, the distribution of the magnetic moment, and the positions of the magnets can be arbitrarily determined. As shown in FIG. 7, the magnets 20 may be magnets in which two or more poles are juxtaposed along the conveying direction of the magnetic display sheet 10 so that the poles of the same polarity confront each other.

Figure 8A:
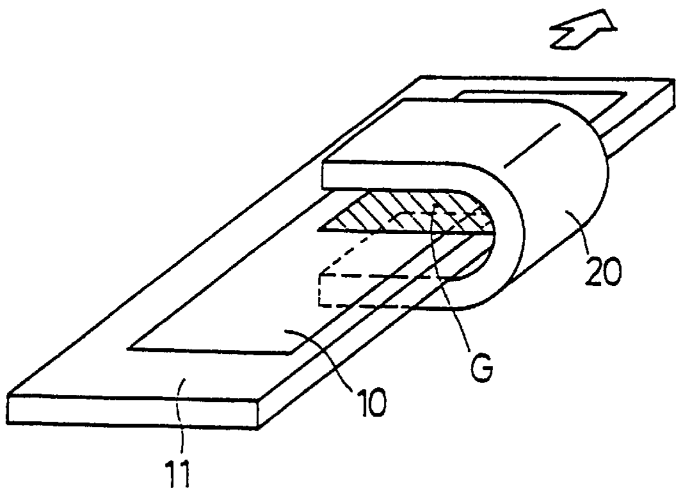
Figure 8B:
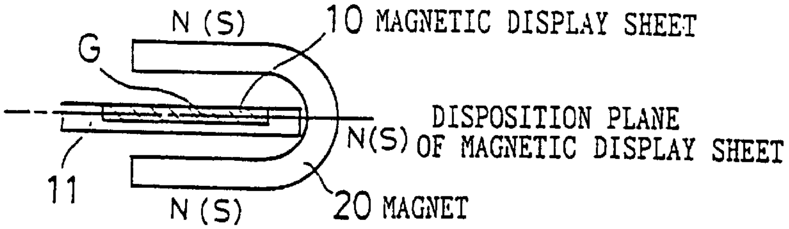
Figure 8C:
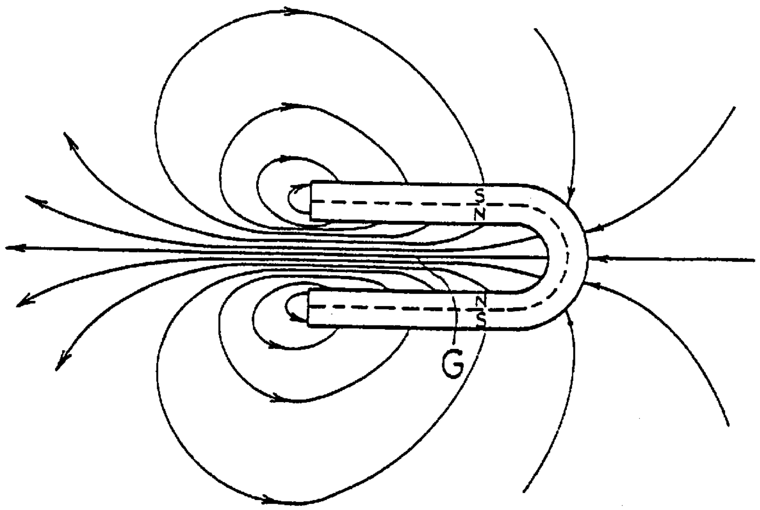
Figure 9A:
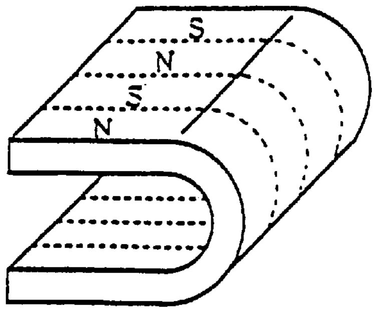
FIGS. 9A and 9B are perspective views of other similar embodiments.
Figure 9B:
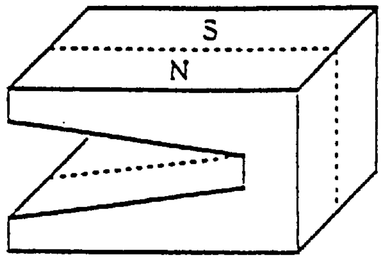

FIGS. 8A–8B show a still further embodiment of the invention, wherein FIG. 8A is a perspective view, FIG. 8B is a sectional view of a magnet, etc. which is taken along a plane vertical to a conveying direction of a magnetic display sheet, and FIG. 8C is a magnetic flux line chart showing a magnetic field produced by the magnet of FIG. 8B. FIGS. 9A and 9B are perspective views showing other similar embodiments, and FIGS. 10A–10B and 11A–11F are perspective views showing still further embodiments.

The magnetic display sheet 10 is formed in a rectangular substrate 11 which is made of a plastic or the like and conveyed by a conveying apparatus, which is not shown (e. g., a belt conveyor), in the longitudinal direction.

As shown in FIGS. 8A–8C, a magnet 20 is formed by bending a rectangular plate-like magnet, having the N-pole on the top face and the S-pole on the back face, into a U-like shape so that the N-pole of one end thereof confronts the N-pole of the other end thereof symmetrically with respect to the magnetic display sheet 10. The projection pattern which is obtained by performing a projection (orthogonal projection) of the magnet 20 onto the plane of the magnetic display sheet 10 is quadrangular (the hatched region). The center of gravity of the projection pattern is indicated by G. The magnetic display sheet 10 is conveyed by conveying means, which is not shown, in the U-shaped gap space defined by the magnet 20.

In the gap space where the magnetic display sheet 10 is conveyed, the magnetic display sheet 10 is surrounded by the N-poles in three directions, namely in the upward and downward directions, and the rightward direction in a sectional view of the magnets 20 which is vertical to the conveying direction of the magnetic display sheet 10. As seen from FIG. 8C showing magnetic flux lines of the magnetic field produced by the magnet 20, magnetic fluxes emitted from the N-pole diverge from the gap space to the external space. Because the synthetic magnetic field of the magnet 20 is symmetrical with respect to a plane, an ideal planar magnetic field is attained on the disposition plane of the magnetic display sheet 10. In the same manner as the embodiment of FIGS. 6A–6C, no magnetic field dead point in the synthesized magnetic field of the magnet 20 is formed on the disposition plane of the magnetic display sheet 10. As far as the erasing operation is performed in a planar magnetic field, therefore, the magnetic display sheet 10 can be erased in both the gap space defined by the magnets 20 and the external space, and thereby the space utilization efficiency of the magnet 20 is enhanced. Since the magnet has an integrated body, the advantage that the magnet is easy to manufacture and handle can be obtained.

Figure 10A:
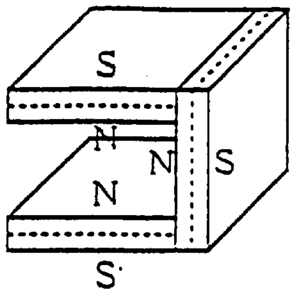
FIGS. 10A and 10B are perspective views of still other embodiments.
Figure 10B:
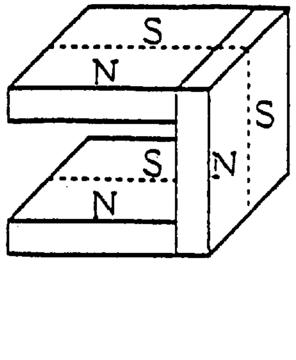
Figure 11A:
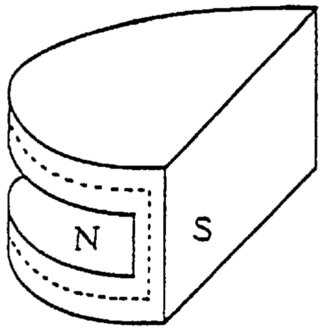
FIGS. 11A through 11F are perspective views of still further embodiments.
Figure 11D:
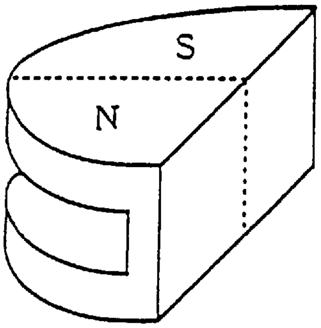
Figure 11B:
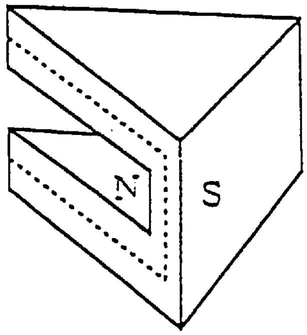
Figure 11E:
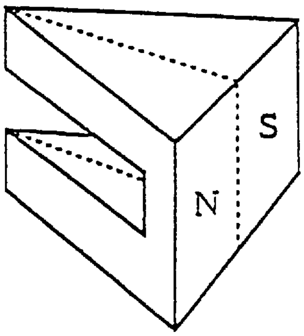
Figure 11C:
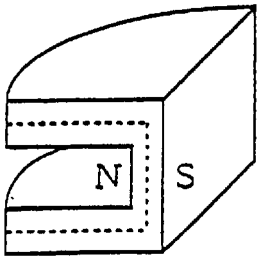
Figure 11F:
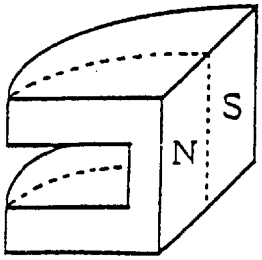
Figure 12:
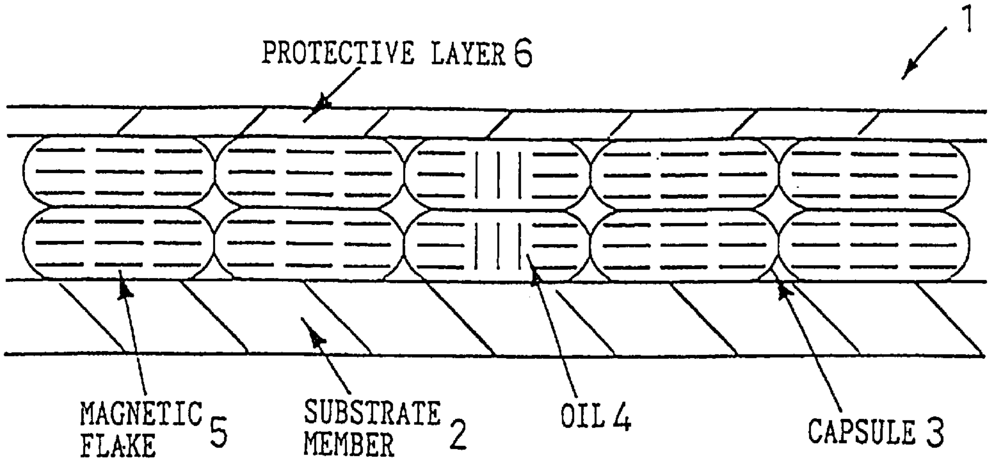
FIG. 12 (PRIOR ART)
FIG. 12 is a sectional view of an example of a magnetic display sheet.

In the embodiment of the invention, the magnetic display sheet 10 is conveyed. Alternatively, the magnet 20 may be moved, or the magnetic display sheet and the magnet may be relatively moved. The magnet 20 may be disposed so as to be angled with respect to the conveying direction of the magnetic display sheet 10 instead of being parallel thereto. The magnetic display sheet 10 is disposed so as to overlap with the projection pattern of the magnet 20. Alternatively, the magnetic display sheet may be disposed at a position where the sheet does not overlap with the projection pattern. The magnet 20 may have a shape other than a U-like shape, for example, an angled U-like shape, an integrated V-like shape, or a horseshoe shape. The magnet 20 may be a magnet in which two or more poles are juxtaposed as shown in FIG. 9A, or in which the thickness is varied as shown in FIG. 9B. The magnet 20 may be a substantially U-like shape magnet which is configured as shown in FIGS. 10A–10B by integrating plural magnets into one body. As shown in FIGS. 11A–11F, the portions of the magnet which have the same polarity and confront each other may have a shape other than a quadrangle, such as a triangle, a semicircle, or a quadrant.

In the embodiments described above, permanent magnets are used. Alternatively, electromagnets may be used. In the case where electromagnets are used, the erasing and unerasing operations are easily selected depending on energization or deenergization of the coils. Under the state where the magnetic display sheet 10 is positioned to remain at rest, therefore, visible information may be erased by energizing the electromagnets.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A magnetic display erasing apparatus for erasing a visible display which is magnetically written into a magnetic display sheet, said apparatus comprising:

magnetic field producing means for generating a planar magnetic field on a disposition plane where the magnetic display sheet is to be disposed, said magnetic field producing means comprising a pair of magnets in which poles of a same polarity confront each other via the disposition plane;

wherein said pair of magnets are magnetized or disposed so that a magnetic field dead point, where magnetic fields produced by the same polarity of said pair of magnets cancel each other and a strength of a resulting magnetic field is zero, is deviated from a center of gravity of a projection pattern formed on the disposition plane by connecting said pair of magnets to each other.

2. A magnetic display erasing apparatus as claimed in claim 1, wherein said pair of magnets are electromagnets.

3. A magnetic display erasing apparatus for erasing a visible display which is magnetically written into a magnetic display sheet, said apparatus comprising:

magnetic field producing means for generating a planar magnetic field on a disposition plane where the magnetic display sheet is to be disposed, said magnetic field producing means comprising a pair of first and second magnets in which poles of a same polarity confront each other via the disposition plane;

wherein a third magnet is disposed so as to have a pole which is directed from an edge of the disposition plane to a space formed between said pair of first and second magnets, and wherein a whole region on the disposition plane in a space surrounded by said pair of first and second magnets and said third magnet is covered with the planar magnetic field.

4. A magnetic display erasing apparatus as claimed in claim 3, wherein said first and second pair of magnets and said third magnet are electromagnets.

5. A magnetic display erasing apparatus for erasing a visible display which is magnetically written into a magnetic display sheet, said apparatus comprising:

magnetic field producing means for generating a planar magnetic field on a disposition plane where the magnetic sheet is to be disposed, wherein said magnetic field producing means has a pole face in which poles of a same polarity confront each other via the disposition plane;

wherein the pole face of said magnetic field producing means is a part of a magnetic body which is continuous or which comprises magnetic members directly connected to each other on an edge of the disposition plane, and wherein faces of said magnetic body which confront each other via the disposition plane are substantially continuous and magnetized to the same polarity.

6. A magnetic display erasing apparatus as claimed in claim 5, wherein said magnetic body and said magnetic members are electromagnets.

* * * * *